United States Patent

[11] 3,587,855

| [72] | Inventor | Gerald L. Roy<br>Lancaster, Pa. |
|---|---|---|
| [21] | Appl. No. | 779,813 |
| [22] | Filed | Nov. 29, 1968 |
| [45] | Patented | June 28, 1971 |
| [73] | Assignee | Armstrong Cork Company<br>Lancaster, Pa. |

[54] HEAT MARKING AND SENSING FOR BOTTLE REJECTION
3 Claims, 1 Drawing Fig.

[52] U.S. Cl. ................................................. 209/111.5,
209/125
[51] Int. Cl. ....................................................... B07c 5/344
[50] Field of Search ............................................ 209/111.5,
73, 74, 125; 198/32; 73/355; 340/227, 228;
346/(Inquired)

[56] References Cited
UNITED STATES PATENTS

| 3,353,651 | 11/1967 | Witmer | 198/32 |
|---|---|---|---|
| 3,356,212 | 12/1967 | Landin | 209/111.5 |
| 3,373,869 | 3/1968 | Burson, Jr. | 209/111.5 |

*Primary Examiner*—Allen N. Knowles
*Attorney*—Clifford B. Price

ABSTRACT: A defective article rejection apparatus for use with glass container manufacturing equipment using plural molds. Defective articles coming from the molds are marked by being heated with a selectively controlled heater. At some part further down the assembly line, when the glass containers are in a single line, a sensing line, a sensing probe will detect the heated bottles and actuate a reject mechanism which will knock the defective glass containers off the conveyor line.

PATENTED JUN 28 1971   3,587,855
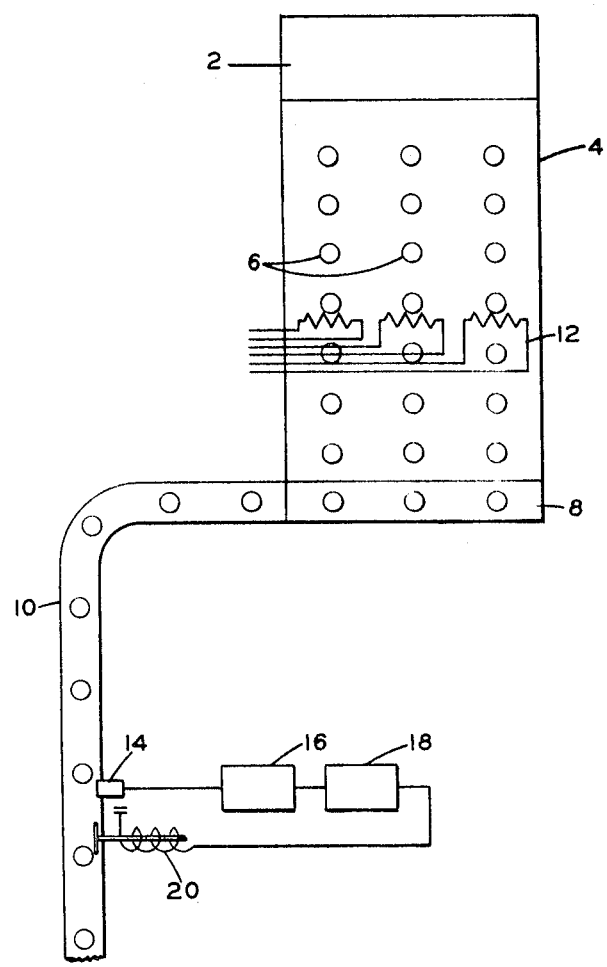
INVENTOR
GERALD L. ROY
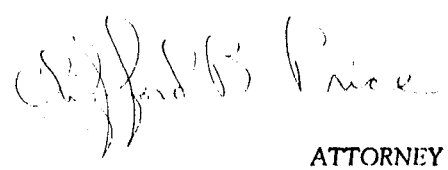
ATTORNEY

HEAT MARKING AND SENSING FOR BOTTLE REJECTION

BACKGROUND OF THE INVENTION

1. Field of the Invention

The invention is directed to an apparatus for marking defective articles and at a later point sensing the marked containers for their rejection. More specifically, the invention deals with thermal marking of the defective articles and heat sensing at a later point for detecting the marked articles.

2. Description of the Prior Art

Various methods are available for the detecting of defective glassware and removing this defective glassware from the assembly line. One of the most common methods is a mere visual inspection of the glassware as it passes down the production line with the manual removal of any defective glassware observed.

Another method for the detection of defective glassware is to pass it by either a mechanical or optical checker, and based upon the readings obtained therein, passing it on to the appropriate station in the manner set forth in U.S. Pat. No. 2,849,114.

Sometimes it is desirable to actually mark the glassware in question, such as shown in U.S. Pat. No. 3,301,394, where the glassware has a mark which indicates the mold from which it came. Then when the particular mold is found to produce defective glassware, all articles which are produced by that mold would be automatically rejected.

Normally, most defects in glassware can be detected by visual examination. When a particular mold is turning out a whole series of defective articles, it is usually best to pick up these defective articles in the lehr area. However, the width of the lehr area is such that it would be just about impossible for one man to reach across the lehr area and remove all defective containers. However, it would be possible for a single individual to detect the defective articles and mark them at this point for later extraction from the production line when the glass containers have moved into a single line formation. The object of the invention herein is to provide a means whereby the defective articles may be marked thermally at the lehr area and later sensed and rejected during the single line phase of the production line.

SUMMARY OF THE INVENTION

The defective article rejection apparatus is for use in the assembly line production in conjunction with the manufacture of glass containers by plural molds. After molding, the containers are placed on a lehr in individual rows associated with each mold. At the cold end of the lehr, a rapid response heater is placed above each row before the containers are formed into a single line. A visual inspection is conducted of the glassware on the cold end of the lehr, and defective containers are marked by turning on the rapid response heater to heat up the defective containers. A heat meter is positioned at an inspection station down the assembly line at a point where the containers are moved in a single line. The heat meter can actuate a reject mechanism. As a defective bottle is noted, the heat meter senses its presence and actuates the reject mechanism to automatically remove the defective container from the line.

BRIEF DESCRIPTION OF THE DRAWING

The drawing is a schematic layout of a glass production line with the heat marking and sensing apparatus positioned therealong.

DESCRIPTION OF THE PREFERRED EMBODIMENT

Glass molding apparatus 2 is used to form the glass containers. After forming the containers, they are deposited on a lehr 4, where they are permitted to cool to a substantial extent. The containers move down the lehr in rows 6, and each row is associated with a particular mold of the glass molding apparatus 2. At the end of the lehr 4, there is an enliner 8 which converts the plurality of rows of glass containers into a single line row configuration. The glass containers then move down a single line conveyor 10 to appropriate sorting and packing stations. Positioned at the end of the lehr is the heat marking structure.

Over each row of glassware is positioned one heater for each row. The heaters have a rapid heat and cool characteristic so that as soon as they are turned on they will cause rapid heating of the glassware moving thereunder, but as soon as turned off will lose their heat so that they will not radiate any heat onto the glassware passing therebelow. The heaters 12 are made of a metallic foil. This foil may be any conventional metal which will withstand the rigors of the required heating, but preferably it will be a stainless steel foil of the austenitic type having a thickness in the range of 0.0005''—0.01''. A heating element similar to that which can be used is set forth in U.S. Pat. No. 2,682,596, issued to D. B. Cox et al.

Control of the heaters will be initiated by an inspector who will provide a visual inspection of the glassware as it moves down the lehr. Normally, mold defects will be repeated on every item produced from the mold until the mold is corrected. Consequently, once a defect is sighted, this defect will probably exist in a whole line of glass containers. Once a defect is sighted, the inspector would then turn on the heater 12 in the appropriate row to mark the defective bottles in that row. The enliner converts the plural rows into a single row. Consequently, the defective bottles of a single row in the plural row configuration are now intermixed and dispersed throughout the single line conveyor structure 10.

Means must now be provided to detect the thermally marked defective bottles and remove these from the single line conveyor 10. A heat sensitive probe 14 detects the bottles which have been thermally marked. The indication picked up by the probe 14 is fed to a conventional amplifier 16, which in turn feeds to a conventional relay 18. The signal from the relay 18 then operates a kicker 20, which is nothing more than a conventional solenoid structure. The kicker 20 knocks the thermally marked defective bottle off the single line conveyor 10.

The temperature sensitive probe 14 is similar to that disclosed in U.S. Pat. No. 3,354,720, issued to N. E. Hager, Jr. The probe is a noncontact heat sensing probe which is highly sensitive to small temperature changes.

In a typical operation of the above system, the electric heaters are operated at 24 volts/40 amps, and the bottles passing under the heater would be heated from the normal 65° F. ambient temperature to approximately 140° F. The bottles will travel for a little more than 2 minutes before they reach the temperature sensing probe and reject station. The thermally marked bottles are at a sufficient temperature above the nonthermally marked bottles so that the increased temperature of the marked bottles only is readily picked up by the probe 14 to carry out the operation of the rejection structure. As a result of the above, a simple technique has now been provided for the marking, detecting and rejection of defective glassware containers.

I claim:

1. A process for selectively segregating articles comprising: placing the articles in individually spaced relationship on a conveyor moving the articles by means of a conveyor uninterruptedly beneath heating means positioned near said articles, selectively actuating said heating means to uniformly thermally heat and therefore mark only selected articles, converting the articles into a single row of randomly separated marked and unmarked articles, moving the single row or articles uninterruptedly past a heat sensing means displaced from said heating means and mounted adjacent the axes of the articles being moved, and selectively removing said marked articles from the unmarked articles by removing means operated by said sensing means.

2. An apparatus for selectively marking and later detecting defective articles comprising: a means for conveying a plurality of articles in a grouping capable of being easily visibly inspected and marked but not conveniently separated into good and defective groupings, each said article being of a substantially uniform mass and composition, means capable of applying heat selectively to an individual article while not effecting adjacent articles with the heat so that the individual article along is heated and therefore marked, means for forming the plurality of articles into a single row and for moving the articles continuously, a heat sensing means positioned adjacent the single row of articles and reject means operated by the sensing means to separate the marked articles from the unmarked articles.

3. The apparatus of claim 2 wherein the plurality of articles are first conveyed by said first-mentioned conveying means in a plurality of parallel rows and said heat applying means are heaters positioned adjacent each row of articles.